US011004231B2

United States Patent
Shivamurthy

(10) Patent No.: US 11,004,231 B2
(45) Date of Patent: May 11, 2021

(54) METHOD FOR DETERMINING A REAL POSITION OF A TRAILER TOW BALL OF A TOW HITCH OF A MOTOR VEHICLE BY MEANS OF AN ASSISTANCE SYSTEM OF THE MOTOR VEHICLE, ASSISTANCE SYSTEM AS WELL AS MOTOR VEHICLE

(71) Applicant: Connaught Electronics Ltd., Tuam (IE)

(72) Inventor: Swaroop Kaggere Shivamurthy, Tuam (IE)

(73) Assignee: Connaught Electronics Ltd., Tuam (IE)

( * ) Notice: Subject to any disclaimer, the term of this patent is extended or adjusted under 35 U.S.C. 154(b) by 0 days.

(21) Appl. No.: 16/508,776

(22) Filed: Jul. 11, 2019

(65) Prior Publication Data

US 2020/0020123 A1    Jan. 16, 2020

(30) Foreign Application Priority Data

Jul. 12, 2018    (DE) .......................... 102018116922.1

(51) Int. Cl.
*G06T 7/70*    (2017.01)
*G06T 7/40*    (2017.01)
(Continued)

(52) U.S. Cl.
CPC ............ *G06T 7/70* (2017.01); *G06K 9/00791* (2013.01); *G06K 9/2054* (2013.01); *G06T 7/40* (2013.01);
(Continued)

(58) Field of Classification Search
CPC ......... G06T 7/70; G06T 7/40; G06K 9/00791; G06K 9/2054; B60D 1/06; B60D 1/36
See application file for complete search history.

(56) References Cited

U.S. PATENT DOCUMENTS

2010/0324770 A1*  12/2010  Ramsey .................... B60D 1/36
                                                                701/25
2014/0200759 A1*  7/2014  Lu .......................... B60D 1/305
                                                                701/28

(Continued)

FOREIGN PATENT DOCUMENTS

DE    10 2014 223 141 A1    5/2016
DE    10 2016 117 284 A1    3/2018

OTHER PUBLICATIONS

Caravan Chronicles—not just another caravan blog, Understanding all about tow ball height, Simon P Barlow (Year: 2016).*
(Continued)

*Primary Examiner* — Jamie J Atala
*Assistant Examiner* — Hesham K Abouzahra
(74) *Attorney, Agent, or Firm* — Osha Bergman Watanabe & Burton LLP

(57)    ABSTRACT

The invention relates to a method for determining a real position (X, Y, Z) of a trailer tow ball (6) of a tow hitch (4) of a motor vehicle (1) by means of an assistance system (9) of the motor vehicle (1) by: capturing the trailer tow ball (6) and determining a characterizing property (11) of the trailer tow ball (6), determining a relative position (x, y) of the characterizing property (11), determining a first real space coordinate (X) and a second real space coordinate (Y), presetting a third real space coordinate (Z) for the third real space coordinate (Z) within a predetermined coordinate interval, generating a comparative position of the trailer tow ball (6) at least depending on the preset third real space coordinate (Z) by means of the electronic computing device (12), determining the real position (X, Y, Z) with the preset third real space coordinate (Z) upon coincidence of the relative position (x, y) with the comparative position. Fur-
(Continued)

Figure 1:
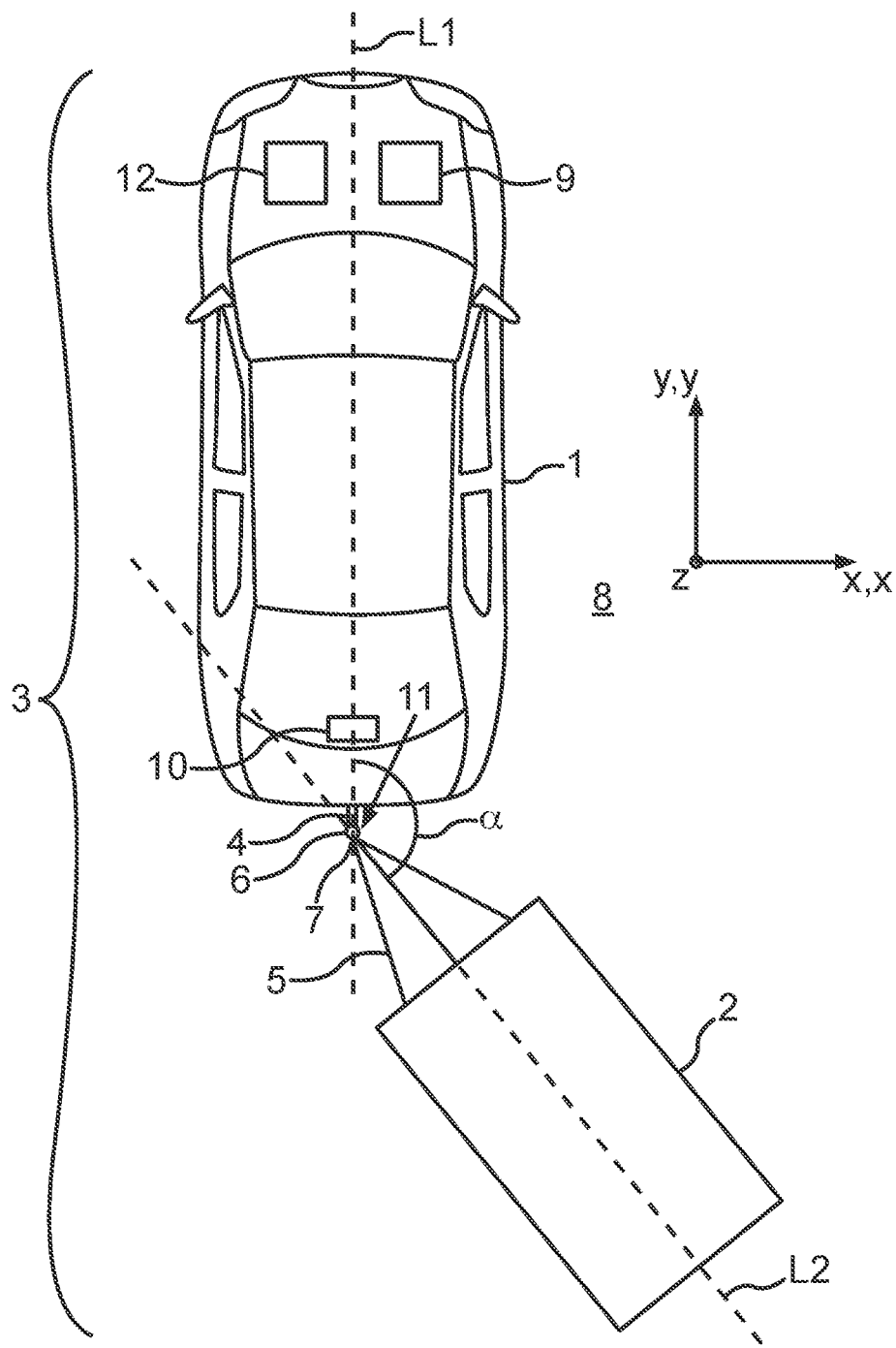

ther the invention relates to an assistance system (9) and to a motor vehicle (1).

14 Claims, 6 Drawing Sheets

(51) Int. Cl.
  *G06K 9/00* (2006.01)
  *G06K 9/20* (2006.01)
  *B60D 1/36* (2006.01)
  *B60D 1/06* (2006.01)

(52) U.S. Cl.
  CPC .................. *B60D 1/06* (2013.01); *B60D 1/36* (2013.01); *G06T 2207/20021* (2013.01); *G06T 2207/20061* (2013.01); *G06T 2207/30252* (2013.01)

(56) References Cited

U.S. PATENT DOCUMENTS

2016/0378118 A1* 12/2016 Zeng .................. B60D 1/62
　　　　　　　　　　　　　　　　　　　　701/28
2018/0081370 A1* 3/2018 Miller .................. B60D 1/36
2018/0361929 A1* 12/2018 Zhang .................. H04N 7/181

OTHER PUBLICATIONS

German Search Report in corresponding German Application No. 102018116922.1, dated May 6, 2019 (10 pages).

* cited by examiner

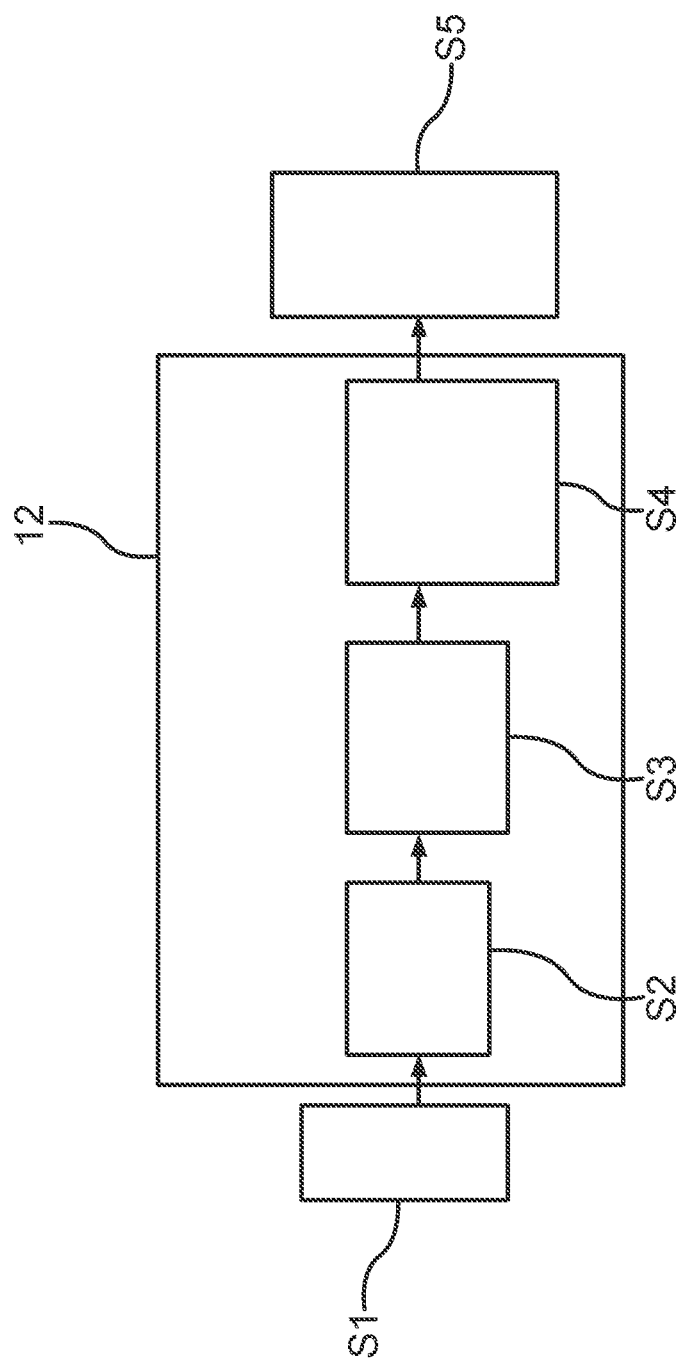

METHOD FOR DETERMINING A REAL POSITION OF A TRAILER TOW BALL OF A TOW HITCH OF A MOTOR VEHICLE BY MEANS OF AN ASSISTANCE SYSTEM OF THE MOTOR VEHICLE, ASSISTANCE SYSTEM AS WELL AS MOTOR VEHICLE

The invention relates to a method for determining a real position of a trailer tow ball of a tow hitch of a motor vehicle by means of an assistance system of the motor vehicle. Further, the invention relates to an assistance system for performing the method as well as to a motor vehicle with the assistance system.

Methods are already known from the prior art to capture a hitch angle between a motor vehicle and an attached trailer. Thereto, for example both the position and the pose of the motor vehicle and the position and the pose of the trailer can in particular be captured. Further, it is known from the prior art that the hitch angle between the motor vehicle and the trailer can be determined for example via image processing devices, which in particular capture the trailer from sides of the motor vehicle. In particular, by determining the hitch angle, a critical situation between the motor vehicle and the trailer can for example be prevented, in which the motor vehicle and the trailer would contact each other.

For ascertaining a hitch angle, in particular the position of the tow hitch with respect to the drawbar of the trailer is of particular importance. In particular, the position of the point of contact, at which the drawbar of the trailer contacts the tow hitch of the motor vehicle, the so-called trailer tow ball, is of interest to be able to reliably determine the hitch angle between the motor vehicle and the trailer.

Nowadays, it is in particular required that the position of the trailer tow ball is manually input by a user of the motor vehicle. However, depending on a pitch angle of the motor vehicle during travel with the trailer, the position of the trailer tow ball can in particular change. This can in particular result in a non-accurate manual measurement of the position of the trailer tow ball, which in turn can result in errors in the interpretation for example for a hitch angle detection system. This can result in a critical situation in the road traffic since the real position of the trailer tow ball cannot be reliably determined.

For example, US 2014/0200759 A1 discloses a rearview system for a vehicle including a rearwards oriented camera, which is arranged at a rear part of a vehicle equipped with the rearview system. The rearwards oriented camera is suitable for capturing images rearwards of the equipped vehicle. If a trailer is in the vicinity and/or at the equipped vehicle and is behind the equipped vehicle, a processor can process the capture images and determine a trailer angle of the trailer relative to a longitudinal axis of the equipped vehicle at least partially depending on such a processing.

Herein, it is disadvantageous that in particular the exact position of the trailer tow ball, in particular with respect to the real environment, cannot be captured by means of the camera. Thereby, errors in determining the hitch angle can occur.

It is the object of the present invention to provide a method, an assistance system as well as a motor vehicle, by means of which a real position of a trailer tow ball of a tow hitch of a motor vehicle can be determined accurate in position and reduced in effort.

This object is solved by a method, an assistance system as well as a motor vehicle according to the independent claims.

An aspect of the invention relates to a method for determining a real position of a trailer tow ball of a tow hitch of a motor vehicle by means of an assistance system of the motor vehicle. The trailer tow ball is captured by means of a capturing device of the assistance system. A characterizing property of the trailer tow ball is determined by means of an electronic computing device of the assistance system. A relative position of the characterizing property with a first relative space coordinate and a second relative space coordinate is determined by means of the electronic computing device. A first real space coordinate is determined depending on the first relative space coordinate and a second real space coordinate is determined depending on the second relative space coordinate by means of the electronic computing device. A third real space coordinate is preset for the third real space coordinate within a predetermined coordinate interval by means of the electronic computing device. A comparative position of the trailer tow ball is generated depending on the first real space coordinate, the second real space coordinate and the preset third real space coordinate by means of the electronic computing device. The relative position is compared to the comparative position by means of the electronic computing device. The real position with the first real space coordinate, with the second real space coordinate and with the preset third real space coordinate is determined upon coincidence of the relative position with the comparative position.

Thereby, it is allowed that the real position of the trailer tow ball can be determined reduced in effort and in precise manner by means of little effort, in particular by means of a single image capture and thereby with a single capture of the tow hitch. In particular, the real position of the trailer tow ball can be performed without an attached trailer. In particular, the method can be simply integrated in already existing assistance systems since the real position of the trailer tow ball can be reliably determined in particular reduced in components. In other words, the method according to the invention is a simple, in particular optically based, automatic approach to be able to reliably determine the real position of the trailer tow ball.

In particular, it can be provided that the real position of the trailer tow ball can be determined both without an attached trailer and with an attached trailer. In particular, the determination of the real position of the trailer tow ball can be performed in real time such that the real position of the trailer tow ball can be reliably determined depending on situation. In particular, the real position of the trailer tow ball can then for example be used to pass this information to a superordinated assistance system. For example, this superordinated assistance system can be used for determining a hitch angle or for determining a movement trajectory of a trailer.

In particular, the real position is to be regarded relative to the environment of the motor vehicle. In other words, the real position is a real position in the environment/in the world. In particular, the real position is to be regarded with respect to a roadway, on which the motor vehicle is located. In particular, the position of the trailer tow ball is to be regarded as the relative position according to the capture of the capturing device. For example, the relative position can be regarded as the position of the trailer tow ball in an image of a camera as the capturing device. Thus, it is a relative position in relation to the capture.

The characterizing property of the trailer tow ball is in particular a so-called key property or a unique property of the trailer tow ball. Since the trailer tow ball in particular is only once arranged at the tow hitch, thus, the position of the trailer tow ball can be reliably determined. This in particular results in the fact that for example in reversing of the motor vehicle with an attached trailer, which is then also referred to as vehicle/trailer combination, a so-called jack knife effect can occur, in which the trailer would then contact the motor vehicle. Here, the vehicle/trailer combination tends to jack-knifing to each other. In other words, the trailer jack-knives relative to the motor vehicle and could contact the motor vehicle with one location. In particular, this can be prevented by the reliable determination of the real position of the trailer tow ball.

Preferably, it can be provided that the method according to the invention is performed on a single electronic computing device. It is also possible that the different method steps can be performed on different electronic computing devices.

Furthermore, it is in particular provided that the coincidence is at least in a presettable tolerance range. For example, a deviation of 5%, in particular of 3%, as the tolerance interval can be regarded as coinciding.

In particular, it is provided that the method steps in the described order are also temporally performed in this order.

The first space coordinate is in particular a space coordinate, which is in the horizontal plane of the motor vehicle in particular in vehicle transverse axis of the motor vehicle. The second space coordinate is in particular a space coordinate, which is also formed in the horizontal axis, but viewed in the direction of the vehicle longitudinal axis. The third space coordinate is in particular a space coordinate, which is in the vertical plane of the motor vehicle and thus is formed viewed in the direction of the vehicle vertical axis.

According to an advantageous form of configuration, a further third real space coordinate is preset for the third real space coordinate within the coordinate interval for generating a further comparative position upon a deviation of the comparative position from the relative position and a further comparison between the relative position and the further comparative position is performed, and upon coincidence of the relative position with the further comparative position, the real position is determined depending on the first real space coordinate, the second real space coordinate and the preset further third real space coordinate. In particular, if a deviation with respect to the tolerance interval should be determined, thus, the further third real space coordinate is determined. If the determined comparative position should then coincide with the relative position within the tolerance interval, the real position is determined depending on the further third real space coordinate. In other words, if it should turn out in the first comparison that the preset third real space coordinate is not appropriate, such that a difference appears between the comparative position and the relative position, thus, a further third real space coordinate is preset, which is in particular different from the preset third real space coordinate, whereby the real position can then be ascertained for example by means of a trial and error approach. This in particular has the advantage that the real position of the trailer tow ball can be determined via a simple trial and error method. This is in particular reduced in effort yet reliable such that the safety in the road traffic can be increased.

It has further proven advantageous if a trailer tow ball center of the trailer tow ball is captured as the characterizing property of the trailer tow ball. In particular, the trailer tow ball center can be captured as a unique property of the trailer tow ball. For example, the trailer tow ball center of the trailer tow ball can be flattened, whereby the trailer tow ball center can be reliably and simply extracted from the captured tow hitch as the characterizing feature or as the characterizing property. Furthermore, the trailer tow ball center is in particular of particular importance since the pivot between the motor vehicle and the attached trailer is at least substantially in the vicinity of the trailer tow ball center. Thus, for example a hitch angle between the trailer and the motor vehicle can be reliably determined.

Preferably, it can be provided that the real position of the trailer tow ball is for example considered by presetting an additional distance of the real position of the trailer tow ball from the trailer tow ball center. This results in an even more precise ascertainment of the real position of the trailer tow ball. Thereby, a hitch angle between the trailer and the motor vehicle can for example be even more reliably and precisely determined.

Similarly, it is advantageous if the third real space coordinate is preset as a height between 350 mm and 420 mm as the coordinate interval relative to a roadway, on which the motor vehicle is located. In particular, the coordinate interval can include the 350 mm and the 420 mm, which is in particular to be regarded as the relative height to the roadway, on which the motor vehicle is located. The preset coordinate interval of 350 mm and 420 mm is in particular a rule, in which height the trailer tow ball is allowed to be located relative to a roadway, on which the motor vehicle is located The limits of the coordinate interval preset in the present example are in particular preset by the EC Directive 94/20/EC rule. In particular, the values for the third real space coordinate are the height of the trailer tow ball relative to the roadway in the loaded state of the trailer. By presetting the coordinate interval, thus, the comparison and the ascertainment of the real position can be performed reduced in effort since the third real space coordinate is only preset in this range. Thus, the real position of the trailer tow ball can be determined in time saving and resource saving manner and in simple manner.

Preferably, it can be provided that the limits of the coordinate interval are dependent on national specifications. In other words, the respective limits of the coordinate interval for the third real space coordinate can be dependent on respective national specifications and differ in different countries. The respective coordinate interval can then in particular be preset depending on the respective national specification.

In a further advantageous form of configuration, a nearest neighbor classification is used for determining the first real space coordinate and/or the second real space coordinate. In other words, it is a nearest neighbor search. This is a parameter-free approach for estimating probability density functions. Thus, it is a classification method, in which a class allocation is performed considering the nearest neighbor. Thus, it is a simple approach to determine the first real space coordinate and/or the second real space coordinate depending on the trailer tow ball. In other words, the relative first space coordinate of the captured trailer tow ball and/or the second relative space coordinate of the captured trailer tow ball are converted into the first real space coordinate and/or the second real space coordinate by the nearest neighbor classification. Thereby, the first real space coordinate and/or the second real space coordinate can be simply yet reliably determined.

It is also advantageous if the real position is used for determining a hitch angle between the motor vehicle and a trailer attached to the motor vehicle and/or for determining a trailer position of the trailer attached to the motor vehicle. If the trailer is attached to the motor vehicle, this is in particular also referred to as vehicle/trailer combination. In particular, the real position can be used to reliably and precisely determine the hitch angle between the motor vehicle and the trailer. In particular, it can thereby be prevented that a critical situation, in which the motor vehicle and the trailer would contact each other, can occur since the hitch angle can be reliably determined. Further, a trailer position of the motor vehicle can be determined by the reliable determination of the real position of the trailer tow ball. In particular in the drive operation of the vehicle/trailer combination, cornering can thus for example be reliably performed since the trailer position is known to a user of the motor vehicle. This results in improvement and increase of the safety in the road traffic.

Further, it has proven advantageous if the trailer tow ball is captured by means of a capturing device formed as a camera. An image can in particular be captured by the camera, in which at least the tow hitch with at least the trailer tow ball is located. In particular, the trailer tow ball can then be reliably captured within the image of the camera for example by means of an image processing program. Furthermore, since cameras are already installed in the motor vehicle in series, this has the advantage that they can be used to perform the method according to the invention. This results in an application of the method reduced in components.

In a further advantageous form of configuration, an image with at least the trailer tow ball is captured by means of the camera and the trailer tow ball is captured by block segmentation of the image. Therein, the image is in particular divided into blocks of equal size. The blocks can then for example have a size of N×N. Preferably, it can be provided that N is a multiple of 8 for improved performance of the method. Thereby, a simple and reliable determination of the trailer tow ball in the image is allowed.

According to a further advantageous form of configuration, a region of interest can be preset within an image captured by the camera for capturing the trailer tow ball, within which the trailer tow ball is located. The region of interest is also referred to as ROI. Thereto, it can in particular be provided that the image can for example be divided into three sections. These three sections can in particular be preset by a pattern study. In particular, the image can then be divided into rectangular sections. In particular, it can then be provided that the region of interest is preset by the specification, which respective section with the region of interest is selected. In particular, it is provided that the trailer tow ball is located in the section. This results in the fact that only that section with the trailer tow ball is correspondingly evaluated for capturing the trailer tow ball. Thereby, the trailer tow ball can be captured within the captured image in resource saving and time saving manner.

In a further advantageous form of configuration, the trailer tow ball can be captured in an image of the camera by means of a texture analysis. In particular, a simple texture analysis can be performed within the image by the block segmentation. Thereby, it can in particular be realized that the texture analysis can be reliably performed within the image depending on the nearest neighbor. This results in the fact that differences from image area to image area can in particular be reliably determined. In particular, the tow hitch with the tow ball is a unique property within the image, which can be simply determined based on the texture analysis. In particular, corresponding texture values are found within the image for the tow hitch or the trailer tow ball such that the trailer tow ball can be simply and reliably captured within the image.

Preferably, it can be provided that a detection of a histogram of the texture is performed within a respective section, in particular with the region of interest, for the texture analysis. For example, the index and the value of the histogram can then be extracted. In particular, the value within the histogram can be ascertained by means of a preset abnormity threshold value within the texture, which can in particular be preset. In particular, it can be differentiated within the histogram if it is a repeating property or a non-repeating property. In particular, the blocks of the non-repeating property can be used for texture analysis for capturing the tow hitch. In particular, those blocks are then further analyzed and evaluated.

Further, it can in particular be provided that the trailer tow ball is captured in an image of the camera by means of a luminance analysis. In particular, the characterizing property of the trailer tow ball can also be determined based on the luminance. Thereby, the trailer tow ball can be reliably captured and in particular alternatively for example to the texture analysis.

Preferably, it can be provided that a detection of a histogram of the luminance is performed within a respective section, in particular with the region of interest, for the luminance analysis. For example, the index and the value of the histogram can then be extracted. In particular, the value within the histogram can be ascertained by means of a preset abnormity threshold value within the luminance, which can in particular be preset. In particular, it can be differentiated within the histogram if it is a repeating property or a non-repeating property. In particular, the blocks of the non-repeating property can be used for luminance analysis for capturing the tow hitch. In particular, those blocks are then further analyzed and evaluated.

In particular, it can be provided that the luminance analysis is performed alternatively or additionally to the texture analysis. In the additional luminance analysis, a redundant possibility of being able to reliably determine the trailer tow ball can in particular be provided.

By the texture analysis and/or the luminance analysis, a trailer tow ball boundary can also preferably be captured within the image of the camera. This results in an improved detection of the trailer tow ball within the image. In particular, an optical boundary within the image is to be understood by the trailer tow ball boundary. This boundary can in particular be reliably captured via the texture analysis and the luminance analysis, respectively.

Preferably, it can be provided that the respective block position can be ascertained depending on the number of the blocks extracted by the texture analysis and/or by the luminance analysis. In particular, the respective uppermost position can then be determined by means of an electronic computing device. In particular, the blocks can be clustered around the respective position, wherein this can in particular be performed via the adjacency. In particular, based on the selection of the clusters, which are in particular located in the center of the image and have a high number of characterizing properties, the position of the trailer tow ball can be selected.

Further, it can be provided that the trailer tow ball is captured as a circle in an image of the camera by means of a Hough transformation. In particular since the trailer tow ball has a spherical shape, the trailer tow ball can be ascertained by means of the Hough circle detection. Further, the approximate trailer tow ball position can also be determined by approach from a left and a right boundary. Thereby, the relative position of the trailer tow ball can be reliably ascertained based on the recognized trailer tow ball within the image.

According to an advantageous form of configuration, an heuristic algorithm, in particular a trial and error algorithm, can be used for determining the real position. Thereby, the real position of the trailer tow ball can in particular be simply yet reliably determined with little computing effort. Thereby, the real position of the trailer tow ball can in particular be determined reduced in effort and in time saving manner. Furthermore, it is thereby allowed that this method can be used on already existing electronic computing devices, for example for image processing of the camera. Thus, the method can be performed reduced in effort and reduced in components.

A further aspect of the invention relates to an assistance system for a motor vehicle with a capturing device and with an electronic computing device, wherein the assistance system is formed for performing the method according to the preceding aspect. In particular, it is provided that the method is performed by the assistance system. In particular, the assistance system is formed as an electronic assistance system.

A further aspect relates to a computer program product with program code means, which are stored in a computer-readable medium to perform the method for determining a real position of a trailer tow ball according to the preceding aspect when the computer program product is run on a processor of an electronic computing device.

A still further aspect of the invention relates to an electronic computing device with a computer program product according to the preceding aspect.

Further, the invention relates to a motor vehicle with an assistance system according to the preceding aspect. The motor vehicle is in particular formed as a passenger car.

Advantageous forms of configuration of the method are to be regarded as advantageous forms of configuration of the assistance system as well as of the motor vehicle. Thereto, the assistance system as well as the motor vehicle comprise concrete features, which allow performing the method or an advantageous form of configuration thereof.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be considered as encompassed and disclosed by the invention, which are not explicitly shown in the figures and explained, but arise from and can be generated by the separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

Now, the invention is explained in more detail based on preferred embodiments as well as with reference to the attached drawings.

Figure 4:
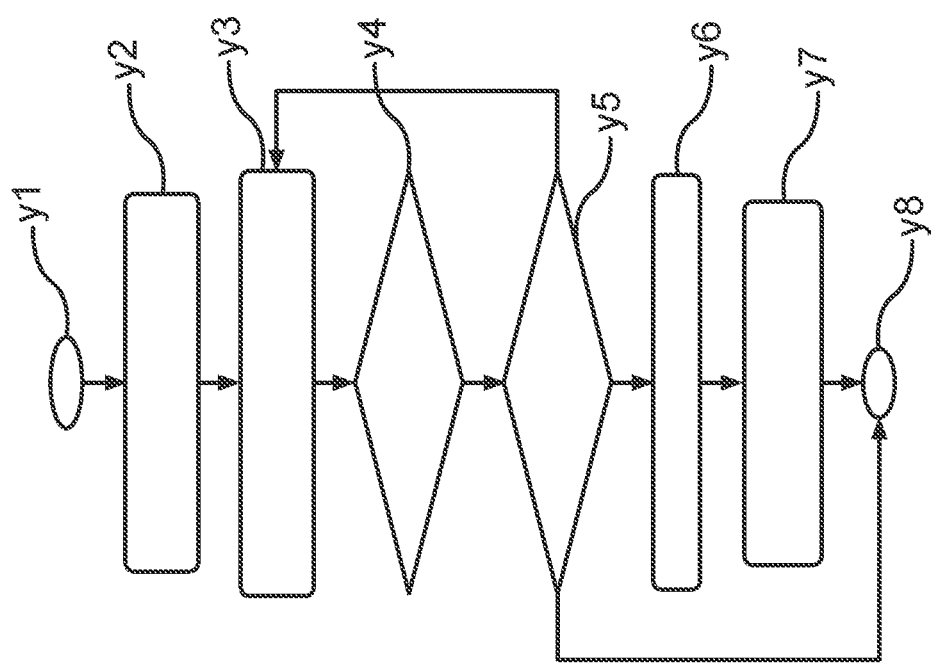
Figure 3:
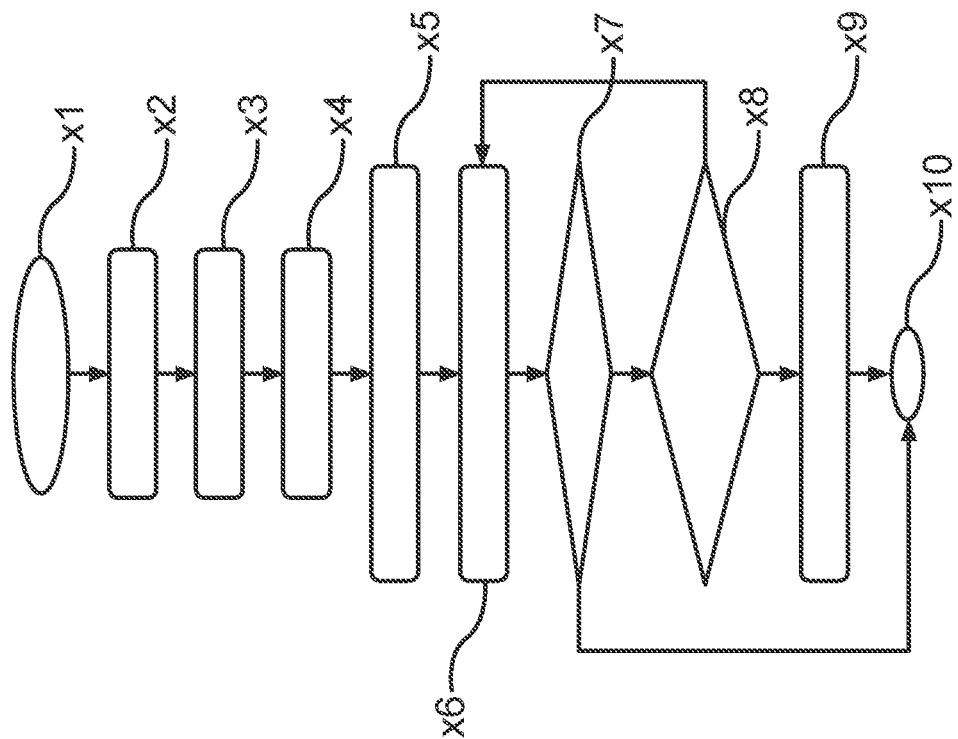
Figure 5:
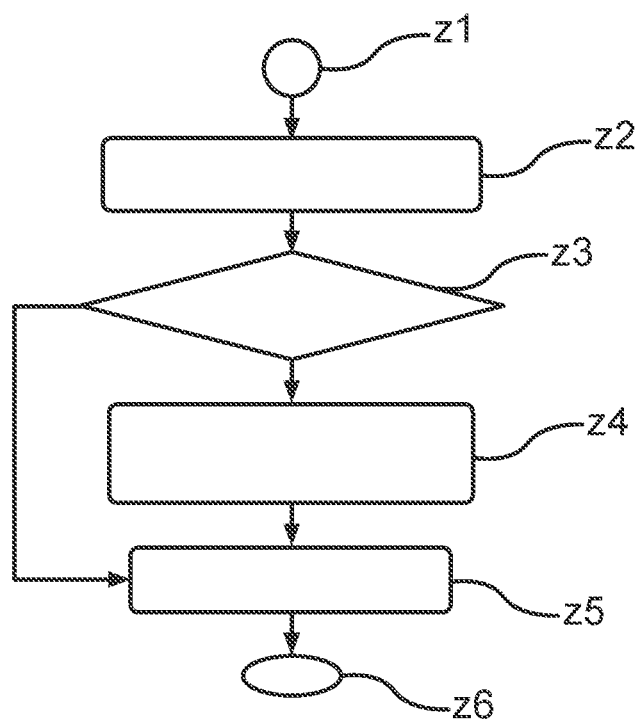
Figure 6:
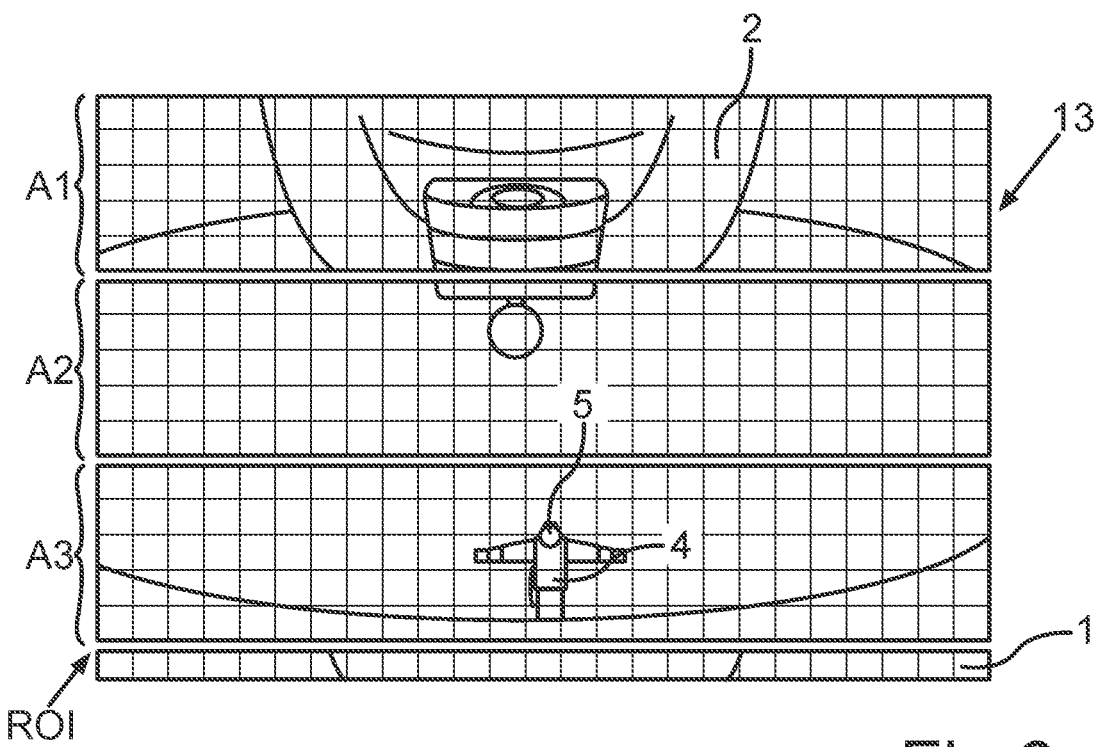
Figure 7:
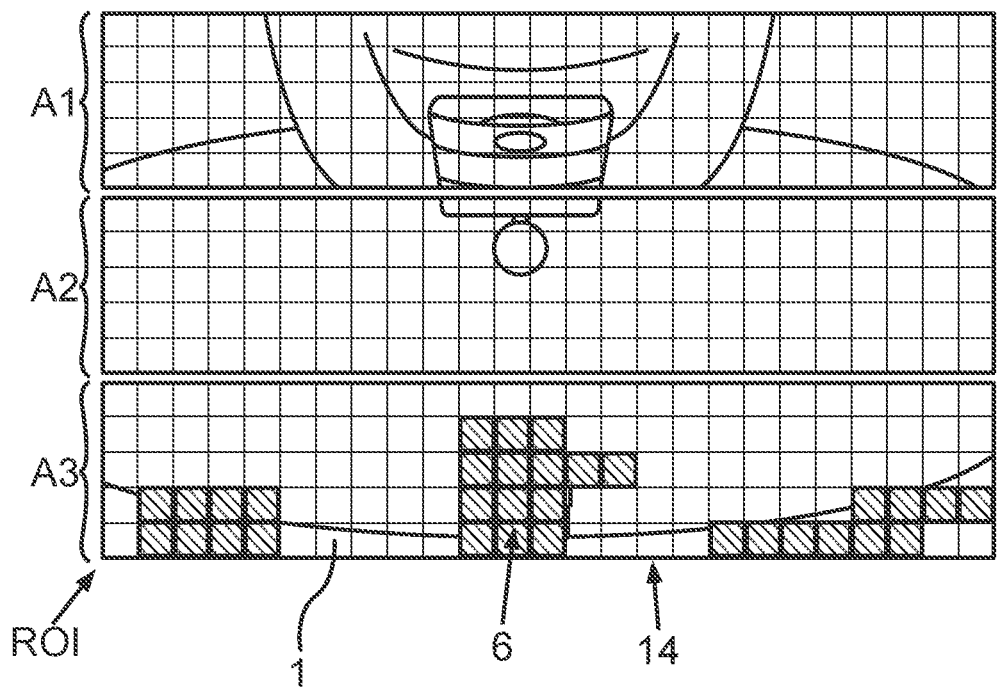
Figure 8:
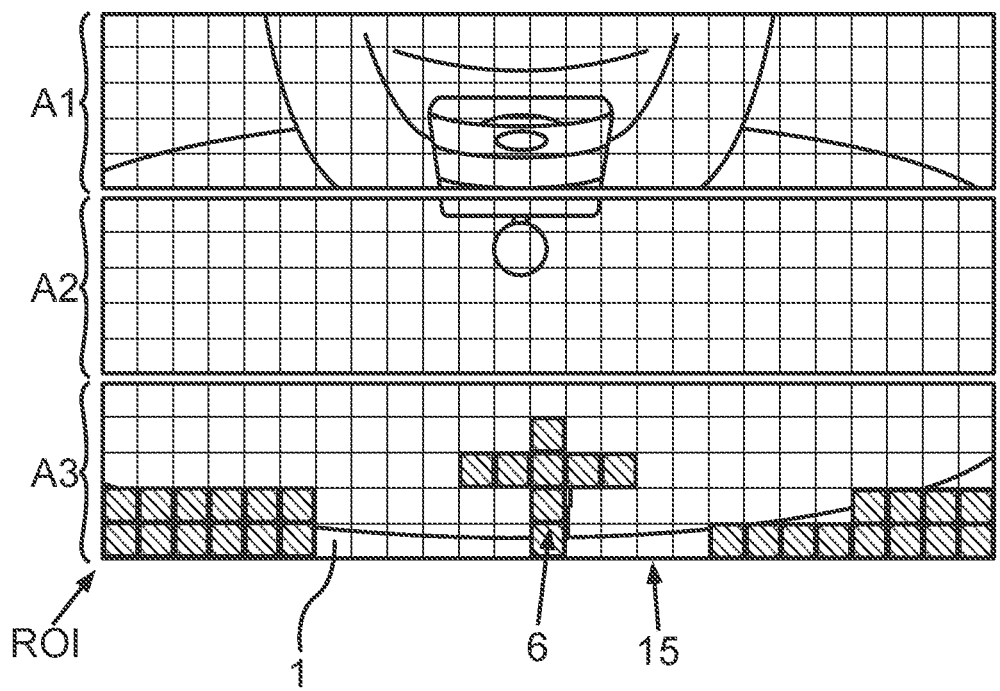
Figure 9:
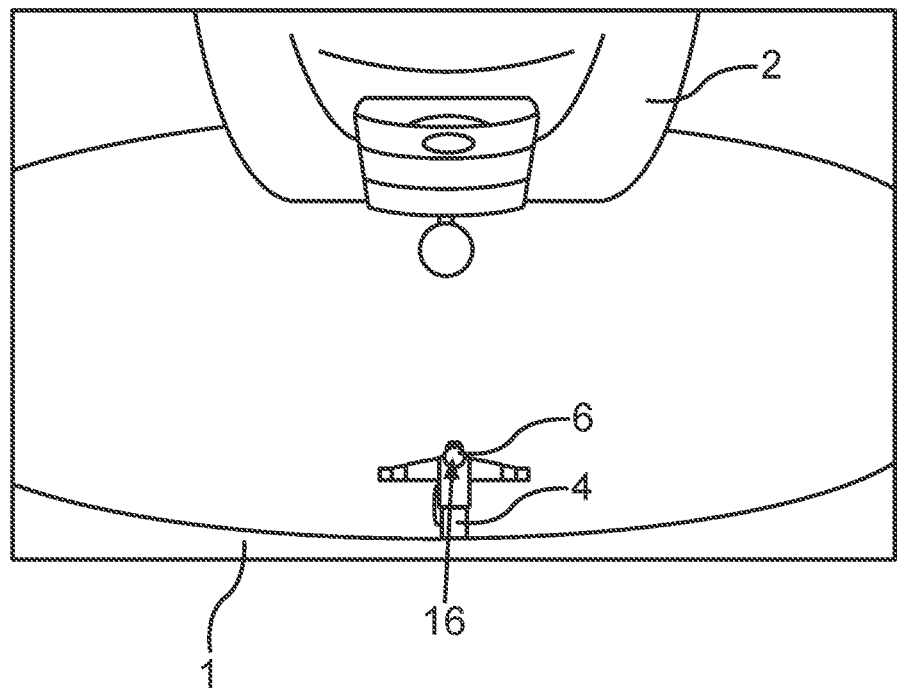

There show:

FIG. 1 a schematic top view to a motor vehicle with an attached trailer;

FIG. 2 a schematic flow diagram of an embodiment of an assistance system;

FIG. 3 a schematic flow diagram according to an embodiment of the method;

FIG. 4 a further schematic flow diagram according to an embodiment of the method;

FIG. 5 a still further flow diagram according to an embodiment of the method;

FIG. 6 a schematic partial view of an embodiment of a motor vehicle;

FIG. 7 a further schematic partial view of the motor vehicle according to FIG. 6;

FIG. 8 a still further schematic partial view of the motor vehicle according to FIG. 6; and FIG. 9 a still further schematic partial view of the motor vehicle according to one of FIG. 6 to FIG. 8.

In the figures, identical or functionally identical elements are provided with the same reference characters.

FIG. 1 shows an embodiment of a motor vehicle 1 with a trailer 2 attached to the motor vehicle 1 in a schematic top view. The trailer 2 is in the attached state at the motor vehicle 1. The motor vehicle 1 with the trailer 2 constitutes a vehicle/trailer combination 3 in the attached state. In particular, it is provided that the motor vehicle 1 comprises a tow hitch 4. The trailer 2 can then be coupled to the tow hitch 4 via a drawbar 5.

In particular, it is provided that the motor vehicle 1 has a first longitudinal axis L1 and the trailer 2 has a second longitudinal axis L2. In particular, an angle α is formed between the first longitudinal axis L1 and the second longitudinal axis L2 in the present embodiment, which can also be referred to as hitch angle. The tow hitch 4 comprises a trailer tow ball 6. In particular, a real position X, Y, Z of the trailer tow ball 6 with respect to an environment 8 of the motor vehicle 1 is formed by a trailer tow ball center 7 of the trailer tow ball 6. The real position 7 in particular describes the position with respect to a roadway, on which the motor vehicle 1 is located.

In particular, the motor vehicle 1 comprises an assistance system 9. The trailer tow ball 6 of the tow hitch 4 is captured by means of a capturing device 10 of the assistance system 9. A characterizing property 11 of the trailer tow ball 6 is determined by means of an electronic computing device 12 of the assistance system 9. A relative position x, y of the characterizing property 11 with a first relative space coordinate x and a second relative space coordinate y is determined by means of the electronic computing device 12. A first real space coordinate X is determined depending on the first relative space coordinate x and a second real space coordinate Y is determined depending on the second relative space coordinate y by means of the electronic computing device 12. A third real space coordinate Z is preset for the third real space coordinate Z within a predetermined coordinate interval by means of the electronic computing device 12. A comparative position of the trailer tow ball 6 is determined depending on the first real space coordinate X, the second real space coordinate Y and the preset third real space coordinate Z by means of the electronic computing device 12. The relative position x, y is compared to the comparative position by means of the electronic computing device 12. The real position X, Y, Z with the first real space coordinate X, with the second real space coordinate Y and with the preset third real space coordinate Z is determined upon coincidence of the relative position x, y with the comparative position.

Thereby, it is allowed that the real position X, Y, Z of the trailer tow ball 6 can be determined reduced in effort and in precise manner by means of little effort, in particular by means of a single image capture and thereby with a single capture of the tow hitch 4. In particular, the real position X, Y, Z of the trailer tow ball 6 can be performed without an attached trailer 2. In particular, the method can be simply integrated in already existing assistance systems 9 since the real position X, Y, Z of the trailer tow ball 6 can be reliably determined in particular reduced in components. In other words, the method according to the invention is a simple, in particular optically based, automatic approach to be able to reliably determine the real position X, Y, Z of the trailer tow ball 6.

Furthermore, it is in particular provided that the coincidence is at least in a presettable tolerance range. For example, a deviation of 5%, in particular of 3%, as the tolerance interval can be regarded as coinciding.

In particular, it is provided that the method steps in the described order are also temporally performed in this order.

In particular, it can be provided that the real position X, Y, Z of the trailer tow ball 6 can be determined both without an attached trailer 2 and with an attached trailer 2. In particular, the determination of the real position X, Y, Z of the trailer tow ball 6 can be performed in real time such that the real position X, Y, Z of the trailer tow ball 6 can be reliably determined depending on situation. In particular, the real position X, Y, Z of the trailer tow ball 6 can then for example be used to pass this information to a superordinated assistance system. For example, this superordinated assistance system can be used for determining the hitch angle α or for determining a movement trajectory of the trailer 2.

Further, it is in particular provided that a further third real space coordinate Y is preset for the third real space coordinate Y within the coordinate interval for generating a further comparative position upon deviation of the comparative position from the relative position x, y and a further comparison between the relative position x, y and the further comparative position is performed and the real position X, Y, Z is determined depending on the first real space coordinate X, the second real space coordinate Y and the preset further third real space coordinate Z upon coincidence of the relative position x, y with the further comparative position.

Further, it can in particular be provided that the trailer tow ball center 7 of the trailer tow ball is captured as the characterizing property 11 of the trailer tow ball 6. In particular, the trailer tow ball center 7 can be captured as a unique property of the trailer tow ball 6. For example, the trailer tow ball center 7 of the trailer tow ball 6 can be flattened, whereby the trailer tow ball center 7 can be reliably and simply extracted from the captured tow hitch 4 as the characterizing feature or as the characterizing property. Furthermore, the trailer tow ball center 7 is in particular of particular importance since the pivot between the motor vehicle 1 and the attached trailer 2 is at least substantially in the vicinity of the trailer tow ball center 7. Thus, the hitch angle α between the trailer 2 and the motor vehicle 1 can for example be reliably determined.

Further, it can in particular be provided that the third real space coordinate Y is preset as a height between 350 mm and 420 mm as the coordinate interval relative to a roadway, on which the motor vehicle 1 is located. In particular, the coordinate interval can include the 350 mm and the 420 mm, which is in particular to be regarded as the relative height to the roadway, on which the motor vehicle 1 is located. The preset coordinate interval of 350 mm and 420 mm is in particular a rule, in which height the trailer tow ball 6 is allowed to be located relative to a roadway, on which the motor vehicle 1 is located. The limits of the coordinate interval preset in the present example are in particular preset by the EC Directive 94/20/EC rule. In particular, the values for the third real space coordinate Y are the height of the trailer tow ball 6 relative to the roadway in the loaded state of the trailer 2. By presetting the coordinate interval, thus, the comparison and the ascertainment of the real position X, Y, Z can be performed reduced in effort since the third real space coordinate Y is only preset in this range. Thus, the real position X, Y, Z of the trailer tow ball 6 can be determined in time saving and resource saving manner and in simple manner.

Further, it can be provided that a nearest neighbor classification is used for determining the first real space coordinate X and/or the second real space coordinate Y. In other words, it is a nearest neighbor search. This is a parameter-free approach for estimating probability density functions. Thus, it is a classification method, in which a class allocation is performed considering the nearest neighbor. Thus, it is a simple approach to determine the first real space coordinate X and/or the second real space coordinate Y depending on the trailer tow ball 6. In other words, the relative first space coordinate x of the captured trailer tow ball 6 and/or the second relative space coordinate y of the captured trailer tow ball 6 are converted into the first real space coordinate X and/or the second real space coordinate Y by the nearest neighbor classification. Thereby, the first real space coordinate X and/or the second real space coordinate Y can be simply yet reliably determined.

Overall, it is preferably provided that a heuristic algorithm, in particular a trial and error algorithm, is used for determining the real position X, Y, Z. Thereby, the real position X, Y, Z of the trailer tow ball 6 can in particular be simply yet reliably determined with little computing effort. Thereby, the real position X, Y, Z of the trailer tow ball 6 can in particular be determined reduced in effort and in time saving manner. Furthermore, it is thereby allowed that this method can be used on already existing electronic computing devices 12, for example for image processing of the camera. Thus, the method can be performed reduced in effort and reduced in components.

FIG. 2 shows a schematic view of a flow diagram of the method. In step S1, the tow hitch 4 with the trailer tow ball 6 is in particular captured by means of the capturing device 10. In particular, it can be provided that the capturing device 10 is formed as a camera and an image is in particular captured, which shows the trailer tow ball 6 with the tow hitch 4.

In step S2, the segmentation of the trailer tow ball 6 in particular occurs for example within the image by means of image processing, in particular within the electronic computing device 12.

In step S3, the characterizing property 11, in particular the trailer tow ball center 7 with the first relative space coordinate x and the second relative space coordinate y is in particular detected.

In step S4, it is in particular provided that the real position X, Y, Z is determined by means of the electronic computing device 12.

In particular, it can be provided that the determined real position X, Y, Z is then passed to a superordinated system in step S5 such that the angle α can for example be reliably determined. In other words, the real position X, Y, Z is in particular used for determining the hitch angle α between the motor vehicle 1 and the trailer 2 and/or for determining a trailer position of the trailer 2.

FIG. 3 shows a schematic flow diagram of a partial aspect of the method. In particular, FIG. 3 shows how the first real space coordinate X can be determined. In step x1, the method is begun. In step x2, the resources for capturing the trailer tow ball 6 are assigned and initialized. In step x3, the configuration parameters are initialized. In step x4, the trailer tow ball segmentation is performed. In step x5, the real position of the trailer tow ball 6 is initialized, wherein the real position initializes with the values of X=0, Y=0 and Zmin, wherein Zmin=350 mm. In step x6, a pixel-wise assignment occurs, wherein the X value is increased by 1 mm. In step x7, it is examined if the real space coordinate X is less than the relative space coordinate x. If this should not apply, it is passed to step x10. If this should apply, it is decided in step x8 if a corresponding deviation corresponds to a minimum deviation. If this is not the case, it is returned to step x6. If this is the case, the found X is determined as the first real space coordinate X. In step x9 and in step x10, the method is ended.

FIG. 4 shows a part of the method according to the invention in a schematic flow diagram. In particular, FIG. 4 shows how the second real space coordinate Y can be determined. In step y1, the real position of the trailer tow ball 6 is initialized, wherein the real position initializes with the values of X=X, Y=0 and Zmin, wherein Zmin=350 mm. In step y2, a pixel-wise assignment occurs, wherein the Y value is increased by 1 mm. In step y3, it is examined if the real space coordinate Y is less than the relative space coordinate y. If this should not apply, it is passed to step y8. If this should apply, it is decided in step y5 if a corresponding deviation corresponds to a minimum deviation. If this is not the case, it is returned to step y4. If this is the case, the found Y is determined as the second real space coordinate Y. In step y7 and in step y8, the method is ended, wherein in step y7 the first real space coordinate X and the second real space coordinate Y are combined.

FIG. 5 shows a flow diagram according to the method in a schematic view. In particular, it is shown in FIG. 5 how presetting the third real space coordinate Z is performed. In step z1, the method begins. In step z2, the third real space coordinate Z is performed within the coordinate interval. In step z3, it is determined if the comparative position coincides with the relative position x, y. In particular, this is effected by approach to a threshold value, if it should be fallen below the threshold value, thus, it is directly passed to step z5, in which the real position X, Y, Z is determined, and the method is ended in step z6. If the threshold value should not be correspondingly indicated, thus, adaptation of the third real space coordinate Z occurs in step z4.

FIG. 6 shows a partial section of the motor vehicle 1 in a schematic perspective view. In the present embodiment, the trailer 2 is not attached to the tow hitch 4. In particular, FIG. 6 shows that the trailer tow ball 5 is captured by means of the camera as the capturing device 10.

According to FIG. 6, an image 13 has been captured by means of the camera, wherein the image 13 shows at least the trailer tow ball 6 and the trailer tow ball 6 is captured by block segmentation of the image 13. Therein, the image 13 is in particular divided into blocks of equal size. The blocks can then for example have a size of N×N. Preferably, it can be provided that N is a multiple of 8 for improved performance of the method. Thereby, a simple and reliable determination of the trailer tow ball 6 in the image 13 is allowed.

Further, FIG. 6 shows that a region of interest ROI is preset within an image 13 captured by the camera for capturing the trailer tow ball 6, within which the trailer tow ball 6 is located. Thereto, the image 13 is in particular divided into multiple sections A1, A2, A3, wherein the region of interest ROI is in the third section A3 in the present embodiment. Thereto, it can in particular be provided that the image 13 can for example be divided into three sections A1, A2, A3. These three sections A1, A2, A3 can in particular be preset by a pattern study. In particular, the image 13 can then be divided into rectangular sections A1, A2, A3. In particular, it can then be provided that the region of interest ROI is preset by the specification, which respective section A1, A2, A3 with the region of interest ROI is selected. In particular, it is provided that the trailer tow ball 6 is located in the section A1, A2, A3. This results in the fact that only that section A1, A2, A3 with the trailer tow ball 6 is correspondingly evaluated for capturing the trailer tow ball 6. Thereby, the trailer tow ball 6 can be captured within the captured image 13 in resource saving and time saving manner.

FIG. 7 shows a partial section of the motor vehicle 1 in a schematic perspective view. In particular, it is shown in FIG. 7 that the trailer tow ball 6 can be captured in the image 13 of the camera by means of a texture analysis 14. In particular, a simple texture analysis 14 can be performed within the image 13 by the block segmentation. Thereby, it can in particular be realized that the texture analysis 14 can be reliably performed within the image 13 depending on the nearest neighbor. This results in the fact that differences from image area to image area can in particular be reliably determined. In particular, the tow hitch 4 with the trailer tow ball 6 is a unique property within the image 13, which can be simply determined based on the texture analysis 14. In particular, corresponding texture values are found within the image 13 for the tow hitch 4 and the trailer tow ball 6, respectively, such that the trailer tow ball 6 can be simply and reliably captured within the image 13.

Preferably, it can be provided that a detection of a histogram of the texture is performed within a respective section A1, A2, A3, in particular with the region of interest ROI, for the texture analysis 14. For example, the index and the value of the histogram can then be extracted. In particular, the value within the histogram can be ascertained by means of a preset abnormity threshold value within the texture, which can in particular be preset. In particular, it can be differentiated within the histogram if it is a repeating property or a non-repeating property. In particular, the blocks of the non-repeating property can be used for texture analysis 14 for capturing the tow hitch 4. In particular, those blocks are then further analyzed and evaluated.

FIG. 8 shows in a schematic perspective view how the trailer tow ball 6 can be captured in the image 13 by means of a luminance analysis 15. In particular, the characterizing property 11 of the trailer tow ball 6 can also be determined based on the luminance. Thereby, the trailer tow ball 6 can be captured in reliable manner and in particular alternatively for example to the texture analysis 14.

Preferably, it can be provided that a detection of a histogram of the luminance is performed within a respective section A1, A2, A3, in particular with the region of interest ROI, for the luminance analysis 15. The index and the value of the histogram can then for example be extracted. By means of a preset abnormity threshold value within the luminance, which can in particular be preset, the value within the histogram can in particular be ascertained. In particular, it can be differentiated within the histogram if it is a repeating property or a non-repeating property. In particular, the blocks of the non-repeating property can be used for luminance analysis 15 for capturing the tow hitch 4. In particular, those blocks are then further analyzed and evaluated.

In particular, it can be provided that the luminance analysis 15 is performed alternatively or additionally to the texture analysis 14. In particular, a redundant possibility of being able to reliably determine the trailer tow ball 6 can be provided in the additional luminance analysis 15.

Similarly preferably, a trailer tow ball boundary can be captured within the image 13 of the camera by the texture analysis 14 and/or the luminance analysis 15. This results in improved detection of the trailer tow ball within the image 13. In particular, an optical boundary within the image 13 is to be understood by the trailer tow ball boundary. In particular, this boundary can be reliably captured via the texture analysis 14 and the luminance analysis 15, respectively.

Preferably, it can be provided that the respective block position can be ascertained depending on the number of the blocks extracted by the texture analysis 14 and/or by the luminance analysis 15. In particular, the respective uppermost position can then be determined by means of an electronic computing device 12. In particular, the blocks can be clustered around the respective position, wherein this can in particular be performed via the adjacency. In particular, based on the selection of the clusters, which are in particular located in the center of the image 13 and have a high number of characterizing properties 11, the position of the trailer tow ball 6 can then be selected.

FIG. 9 shows an embodiment of the method in a schematic perspective view. In particular, it is provided that the trailer tow ball 6 is captured as a circle 16 in the image 13 of the camera by means of a Hough transformation. In particular since the trailer tow ball 6 has a spherical shape, the trailer tow ball 6 can be captured by means of the Hough circle detection. Further, the approximate trailer tow ball position can also be ascertained by approach from a left and a right boundary. Thereby, the relative position x, y of the trailer tow ball 6 can be reliably ascertained based on the recognized trailer tow ball 6 within the image 13.

Overall, the figures show that a heuristic algorithm, in particular a trial and error algorithm, can be used for determining the real position X, Y, Z.

The invention claimed is:

1. A method for determining a real position of a trailer tow ball of a tow hitch of a motor vehicle by an assistance system of the motor vehicle, comprising:
    capturing the trailer tow ball by a capturing device of the assistance system;
    determining a characterizing property of the trailer tow ball by an electronic computing device of the assistance system; determining a relative position of the characterizing property with a first relative space coordinate and a second relative space coordinate by means of the electronic computing device;
    determining a first real space coordinate depending on the first relative space coordinate and a second real space coordinate depending on the second relative space coordinate by the electronic computing device;
    presetting a third real space coordinate for the third real space coordinate within a predetermined coordinate interval by the electronic computing device;
    generating a comparative position of the trailer tow ball depending on the first real space coordinate, the second real space coordinate and the preset third real space coordinate by the electronic computing device;
    comparing the relative position to the comparative position by means of the electronic computing device; and determining the real position with the first real space coordinate, with the second real space coordinate and with the preset third real space coordinate upon coincidence of the relative position with the comparative position,
    wherein a nearest neighbor classification is used for determining the first real space coordinate and/or the second real space coordinate.

2. The method according to claim 1, wherein upon deviation of the comparative position from the relative position, a further third real space coordinate is preset for the third real space coordinate within the coordinate interval for generating a further comparative position and a further comparison between the relative position and the further comparative position is performed, and upon coincidence of the relative position with the further comparative position, the real position is determined depending on the first real space coordinate, the second real space coordinate and the preset further third real space coordinate.

3. The method according to claim 1, wherein a trailer tow ball center of the trailer tow ball is captured as the characterizing property of the trailer tow ball.

4. The method according to claim 1, wherein the third real space coordinate is preset as a height between 350 mm and 420 mm as the coordinate interval relative to a roadway, on which the motor vehicle is located.

5. The method according to claim 1, wherein the real position is used for determining a hitch angle between the motor vehicle and a trailer attached to the motor vehicle and/or for determining a trailer position of the trailer attached to the motor vehicle.

6. The method according to claim 1, wherein the trailer tow ball is captured by a capturing device formed as a camera.

7. The method according to claim 6, wherein an image with at least the trailer tow ball is captured by the camera and the trailer tow ball is captured by block segmentation of the image.

8. The method according to claim 6, wherein for capturing the trailer tow ball within an image captured by the camera, a region of interest is preset, within which the trailer tow ball is located.

9. The method according to claim 6, wherein the trailer tow ball is captured in an image of the camera by means of a texture analysis.

10. The method according to claim 6, wherein the trailer tow ball is captured in an image of the camera by means of a luminance analysis.

11. The method according to claim 6, wherein the trailer tow ball is captured as a circle in an image of the camera by means of a Hough transformation.

12. An assistance system for a motor vehicle with a capturing device and with an electronic computing device, wherein the assistance system is for performing the method according to claim 1.

13. A motor vehicle with an assistance system according to claim 12.

14. A method for determining a real position of a trailer tow ball of a tow hitch of a motor vehicle by an assistance system of the motor vehicle, comprising:
    capturing the trailer tow ball by a capturing device of the assistance system;
    determining a characterizing property of the trailer tow ball by an electronic computing device of the assistance system; determining a relative position of the characterizing property with a first relative space coordinate and a second relative space coordinate by means of the electronic computing device;
    determining a first real space coordinate depending on the first relative space coordinate and a second real space coordinate depending on the second relative space coordinate by the electronic computing device;
    presetting a third real space coordinate for the third real space coordinate within a predetermined coordinate interval by the electronic computing device;

generating a comparative position of the trailer tow ball depending on the first real space coordinate, the second real space coordinate and the preset third real space coordinate by the electronic computing device;

comparing the relative position to the comparative position by means of the electronic computing device; and determining the real position with the first real space coordinate, with the second real space coordinate and with the preset third real space coordinate upon coincidence of the relative position with the comparative position, wherein a heuristic trial and error algorithm is used for determining the real position.

\* \* \* \* \*